June 14, 1927.
H. C. POSSEHL
1,632,194
FISH AND FOWL DRESSING DEVICE
Filed Aug. 4, 1924
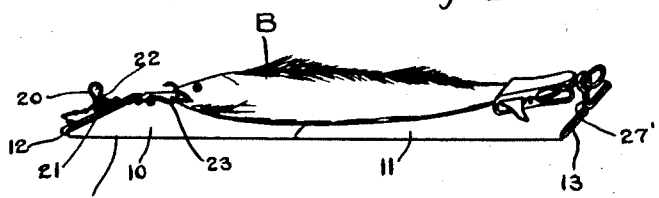
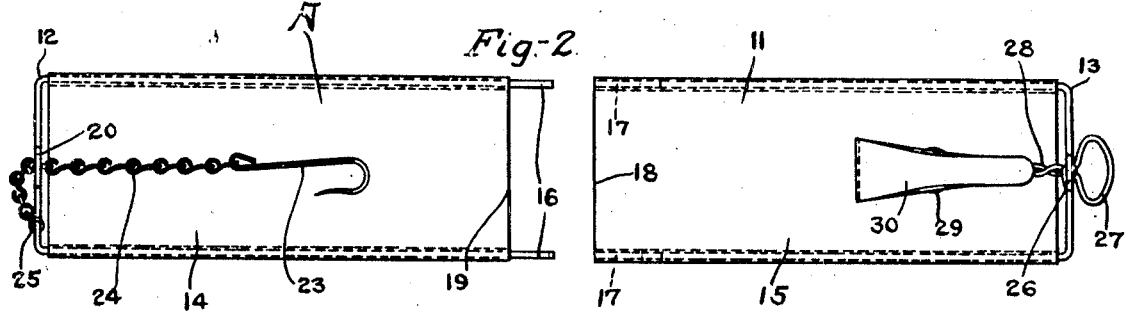
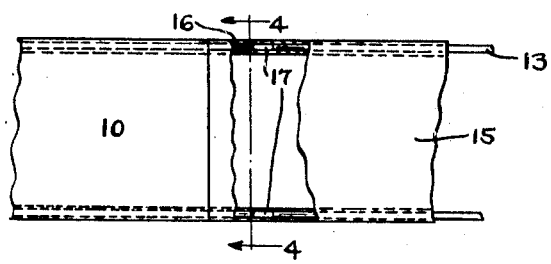
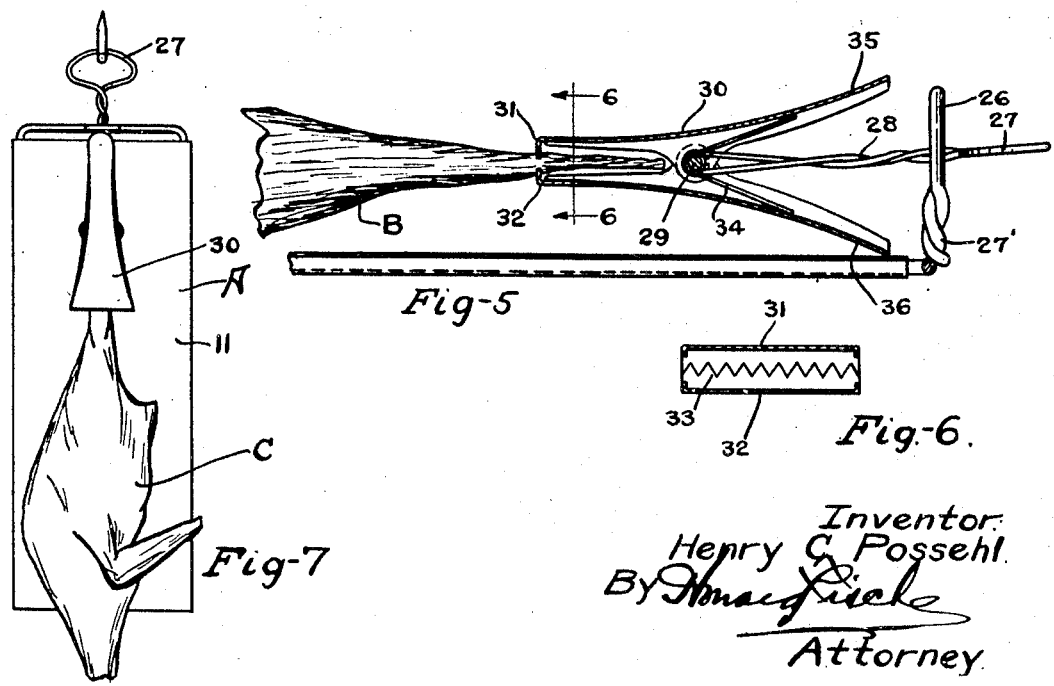
Inventor
Henry C. Possehl
By
Attorney Patented June 14, 1927.

1,632,194

UNITED STATES PATENT OFFICE.

HENRY C. POSSEHL, OF BAKER, MINNESOTA.

FISH AND FOWL DRESSING DEVICE.

Application filed August 4, 1924. Serial No. 729,965.

My invention relates to a holding means, which is adapted to hold a fish or a fowl so that it can be cleaned in a manner so that it is convenient to scale the fish while it is held by my holding means.

Heretofore it has been difficult to hold a fish in trying to scale it and while other devices have been developed, yet they have been of an expensive construction which is not practical for actual use and retail on the market. With this in mind I have made up my holder which is of simple, inexpensive construction and adapted to firmly hold the fish while it is being scaled. My holder is made up of a small number of sections which are of a simple construction.

My holder is designed with adjustable means, so that different lengthed fish can be readily secured to the same and is collapsible so that it can be folded into a small compact case.

It is a feature of my invention to provide a holder which is separable into parts so that it can be taken apart and folded or nested together when not desired for use, or so that one part can be used for holding a chicken or a fowl while it is being picked or cleaned.

The peculiar construction of my holding means, together with other features will be more fully set forth in the following specification and claims:

In the drawings forming part of this specification,

Figure 1 is a perspective view of my holder as it would appear in holding a fish while it is being scaled and cleaned.

Figure 2 is a plan view of my holder with the sections separated from each other.

Figure 3 is a detail, partly in section, of a portion of my holder.

Figure 4 is a section on the line 4—4 of Figure 3.

Figure 5 is an enlarged detail view, partly in section, of a portion of my holder.

Figure 6 is a section on the line 6—6 of Figure 5.

Figure 7 is a view of a portion of one of the sections of my holder as it would appear in use in holding a fowl while the same is being cleaned.

In the drawings my holder A is formed of two parts, 10 and 11, which are made up with a framework 12 and 13 over which extend plate members 14 and 15 of sheet metal.

The frame members 12 and 13 are formed of wire or other suitable material of a light nature and the plate members which form the table of the holding device are secured to the longitudinal sides of the frame members 12 and 13.

The frame member 12 has projecting ends 16 which are adapted to fit in the sockets 17 formed in the end of the plate member 15 by shortening the ends of the frame member 13 so as not to extend to the edge 18 of the plate member 15.

When the sections 10 and 11 of the holder A are put together the ends 16 fit into the sockets 17 and the edge 18 of the plate member 15 abuts against the edge 19 of the plate member 14 so that the members 10 and 11 fit closely and firmly together.

The frame 12 is formed with an eye 20 which is made by crossing the ends of the frame member 12 and twisting them at 21 in a manner to form a slot 22 adjacent the twisted portion of the frame, so that the eye 20 projects therefrom.

The twisted portion 21 of the frame 12 is formed so as to extend approximately at right angles to the longitudinal sides of the frame 12 and from the plate member 14. In this manner the shank formed by the twisted portion 21 supports the eye 20 in which the slot 22 is formed and is of a simple construction, being formed of a single piece of wire to make up the frame or the section 10 of the holder A.

A fish engaging hook 23 is held by a chain 24 which extends through the eye 20 and has its end secured at 25 to the frame 12 adjacent the eye 20. This hook 23 is adapted to engage through the mouth of the fish B so as to hold the fish firmly to the holder. The links of the chain 24 are adjusted into the slot 22 of the eye 20 so as to draw the fish taut in the holder A.

The frame 13 of the portion 11 is formed with an eye 26 which is similar to the eye 20 and is opposite thereto. This eye 26 is formed by twisting the frame 13 and is supported from the twisted portion or shank 27' so as to extend at practically right angles from the plate 15 and end of the frame 13. In this manner the eye is formed integral with the frame portion 13 of the section 11.

Extending through the eye 26 I provide a clamp holding member which is of a very simple construction, having a handle portion 27 which is formed of wire from which a shank portion 28 extends which is formed by twisting the ends of the wire forming the handle 27 and which ends are secured to the pintle 29 of the clamp 30, as illustrated in Figure 5 of my drawings.

The clamp 30 is formed with holding jaws 31 and 32 which are formed with serrated gripping or biting edges which mesh together at 33, as illustrated in Figure 6, when the clamp is in closed position without anything engaged therein. A suitable coil spring 34 of ordinary well known construction is wrapped about the pintle 29 and engages the sides or back portion of the jaws 31 and 32 in a manner so as to spread the handle ends 35 and 36 apart, thus drawing the jaws 31 and 32 together to cause the serrated edges to grip firmly onto any object held in between the same, as illustrated in Figures 1 and 5 of the drawings.

The handle 27 can be engaged so that the clamp 30 can be rotated in the eye supporting member 26. This permits the clamp 30 to be turned around when desired so as to turn the fish over so that either side can be scaled very readily.

The clamp 30 firmly engages the tail of the fish B and by means of the hook 23 the fish is adjustably held by the chain 24 between the clamp and the hook, so that the holder A forms a firm, rigid holding means for holding the fish while removing the scales. After the fish has been thoroughly scaled it can be held in the desired position to open it up and clean it. This is accomplished very easily with my device by simply turning the handle 27 to turn the fish in the desired position.

By means of my holder fishing becomes a real enjoyment because it is not hard to scale and clean the fish after they are caught. It is quite undesirable to hold a fish in one hand while trying to scale it, owing to the natural slipperiness of the fish's scales and body, to say nothing of being injured by the fins of the fish while trying to hold it during the cleaning operation.

The wire frames 12 and 13, together with the sheet metal plate members 14 and 15 form a very simple, inexpensive construction for my holder and it is quit important that the holding means can be folded and packed in a fishing kit or in a camping outfit as may be desired. The utility and practical nature of my holding means will be readily apparent as it is illustrated in Figure 7. The portion 11 of the holding device A can be employed so that the clamp 30 will engage the leg or other portion of a fowl C while the handle 27 is engaged by a hook on the wall, just holding the fowl C in a way that it can be cleaned when desired. In this manner my holding device forms a very useful household utility, the value of which is quite obvious from the simple, inexpensive construction of the same.

In accordance with the patent statutes I have described the principles of operation of my holding means, together with the best embodiment thereof, but I desire to have it understood that the drawings are only illustrative and that the invention can be carried out by other means and applied to uses other than those above set forth within the scope of the following claims.

I claim:

1. A holding device formed of sections, said sections including a wire frame, sheet metal plate members extending across and secured to the longitudinal side edges of each of said sections and supporting eyes formed in said frame integral therewith, adapted to support a holding clamp and adjustable hook respectively to form a supporting means between the ends of said members when they are secured together.

2. A holding device including separable end members, said members comprising a wire frame, supporting eyes formed integral in said wire frame portion, a plate supported by said wire frame to form a table, means for holding said members separable from each other, and fish and fowl holding means supported by said eye members to adjustably hold the fish or fowl to said holding member for the purposes specified.

3. A fish and fowl holding device including separable members, means for holding said members together, each of said members including a wire frame formed from a single piece of wire, a sheet metal plate attached to each of said wire frames in a manner to form a table on which the fish or fowl is held, a loop formed in each of the end members of the wire frame, a spring clamp rotatably secured in one of said loops against disengagement therefrom and an adjustable hook means extending through the other loop formed in the other frame whereby a fish or fowl can be suspended between said clamp and hook so as to firmly hold the same while cleaning.

4. A holding device including a pair of frame members formed with a wire edge, socket means formed in one of said members, adapted to receive the extending wires from the other member to hold the members firmly together, loops formed in the wire ends of said members on the ends thereof, a spring holding clamp swivelly connected to the loop in one of said members and a hook and chain extending through the loop in the other member, the links of said chain being engageable in the loop to adjust the length of the chain whereby said clamp and hook are adjustable apart so as to accommodate different lengths of fish to hold the same in cleaning.

5. A collapsible fish holding device including a pair of members separable from each other, to be folded into a compact state, a spring clamping member swivelly held to one of said members and an adjustable chain and hook held to the other of said members whereby a fish can be held taut between the hook and clamp and the clamp can be rotated to rotate the fish from one side to the other, so that it can be thoroughly scaled and cleaned.

6. A holding device including a wire frame formed from a single piece of wire, a plate means secured to the wire frame, a loop secured to the wire frame, a loop formed in one end of said wire frame and a clamp member pivotally held to said loop against disengagement therefrom in a manner to rotate said clamp for the purposes specified.

7. A holder including a wire frame formed from a single piece of wire, a loop formed in one end of said frame by twisting said wire, a sheet metal plate adapted to hold the free end of said wire spaced apart and form a brace therefor, a spring clamp, a connector extending through said loop formed of wire adapted to connect said clamp against disengagement from said loop and a loop formed in said connector adapted to form a handle which can be made to rotate said clamp and adapted to form a holding loop which is adapted to engage a hook on the wall to hold the frame members and clamp as desired.

HENRY C. POSSEHL.